Oct. 14, 1952     I. SHAPIRO     2,613,563

HINGED CLAMP FOR APPLYING ANTISKID CHAINS

Filed Dec. 31, 1946

Inventor
Isadore Shapiro
By Wooster & Davis Attorneys.

Patented Oct. 14, 1952

2,613,563

UNITED STATES PATENT OFFICE 2,613,563

HINGED CLAMP FOR APPLYING ANTISKID CHAINS

Isadore Shapiro, Danbury, Conn.

Application December 31, 1946, Serial No. 719,400

3 Claims. (Cl. 81—15.8)

This invention relates to a device for applying anti-skid chains to automobile tires. The average individual or driver of motor cars hesitates to use tire chains because of the trouble and time consumed in mounting them. It entails jacking up each wheel, which is a messy and not too easy job, or driving to a garage to have a garage man apply the chains, as it is a difficult operation, especially with the modern form of mudguard, which comes low over the tire. People are thus apt to drive without chains under dangerous conditions. It is, therefore, an object of the present invention to overcome these difficulties, and to provide a device by which the chain may be readily placed in position on the tire and fastened for use.

Another object is to provide a device which may be readily clamped on the tire and rim, and then by backing the car will draw the chain and lay it around the tire in the proper position.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

Figure 1:
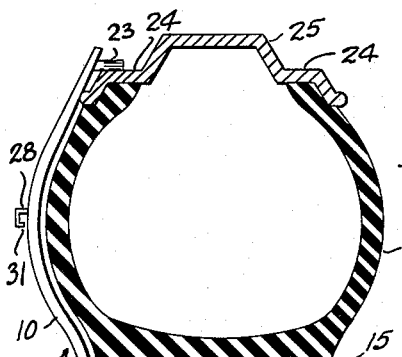
Fig. 1 is a transverse section of the tire showing my improved device being applied thereto, but showing the outside side arm in the open position.

This device comprises a substantially U-shaped clamp 9 including spaced curved side arms 10 and 11 connected by a bar 12 joining the side arms at their lower ends. This connecting bar is adapted to lie across the tread 13 of the tire 14, while the side arms 10 and 11 are adapted to be positioned to embrace the tire on the opposite sides thereof, and are curved to substantially the shape of the side of the tire. The inner arm 10 is preferably rigid with the cross bar 12, while the outer arm 11 is hinged at its lower end to the outer end of the cross bar 12, as indicated at 15. For this purpose the outer end of the bar 12 is forked and the arm 11 is formed on its lower end with a hinge lug 16 extending between the lugs 17 of the fork, and is pivoted to them by the transverse pin 15. This lug 16 is provided with two flat surfaces 18 and 19 at substantially right angles to each other, and at the under side of the fork is mounted a relatively heavy flat spring 20. This spring may be mounted in any suitable way but is preferably secured to the bar 12 by one or more screws 21. This spring may engage either surface 18 or 19, depending on the position of the arm 11, and will therefore lock or yieldingly hold the arms either in the open position of Fig. 1 or closed position of Fig. 3, depending on which surface 18 or 19 the spring engages.

Figure 3:
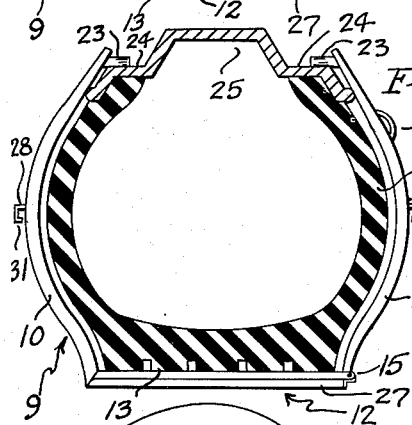
Fig. 3 is a similar view to Fig. 1, showing it in the closed position for applying the chain.
Figure 5:
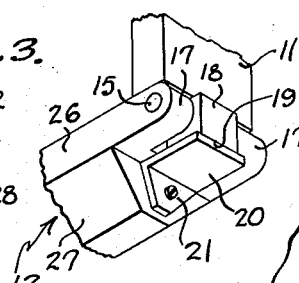
Fig. 5 is a perspective view on an enlarged scale showing the connection and holding means for the hinged side arm and with this arm in the closed position.
Figure 4:
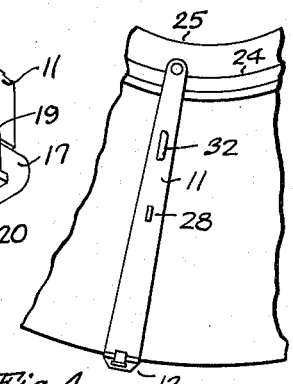
Fig. 4 is a side view looking from the right of Fig. 3.

At the upper ends of the arms they are each provided with an inwardly extending lug 23 adapted to engage over the annular shoulders 24 of the rim 25, as shown in Fig. 3, to retain the device on the tire. The transverse or connecting bar 12 may be of different cross sections, but is preferably formed with a substantially flat upper portion 26 and on its under side with a substantially V-shaped strengthening rib 27. Each of the arms 10 and 11 is also provided on its outer surface with hooks 28 over which the end links 29 of the side chains 30 of an anti-skid chain may be hooked to draw the chain onto the tire. The free ends preferably are lugged or extend inwardly, as shown at 31, so that the links will not become detached or drop off while the chain is being drawn onto the tire. The outer arm may also be provided with a loop or other grip 32 to facilitate swinging the hinged arm 11 outwardly when disconnecting and removing the device from the tires.

Figure 2:
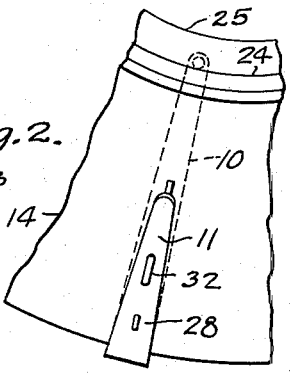
Fig. 2 is a side view looking from the right of Fig. 1.
Figure 7:
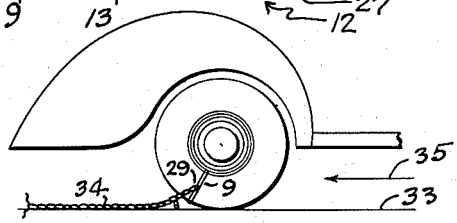
Fig. 7 is a side view of a rear wheel showing how the device is attached to apply the chain.
Figure 6:
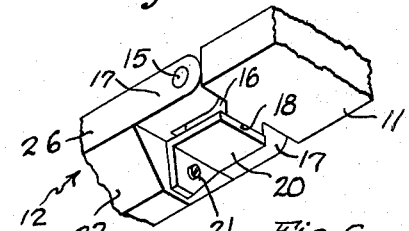
Fig. 6 is a similar view with the arm in the open position.
Figure 8:
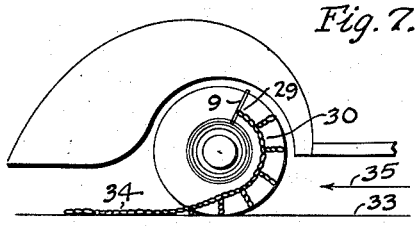
Figs. 8 and 9 are similar views showing how the chain is drawn onto the tire by this device.
Figure 9:
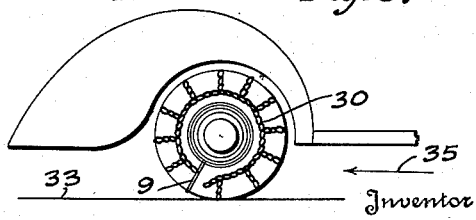

In using the device, the cross or connecting bar 12 is placed under the tread close to the ground just back of the tire, as shown in Figs. 2 and 7, with the arm 10 on the inner side of the tire and with the lug 23 of this arm seated over the inner annular shoulder 24 of the rim 25. While so placing the device the outer arm 11 is swung downwardly to the open position, as shown in Fig. 1, and is held in this position by the spring 20 clamping onto the surface 18. After the device has been so placed, the arm 11 is swung inwardly to the position of Fig. 3, the spring 20 yielding to permit this, bringing its lug 23 at its upper end over the outer annular shoulder 24 of the rim, and this arm is locked in this position by the spring 20 seating on the surface 19 at the lower end of the arm. The end links 29 of the side chains are now hooked over the hooks 28 of the side arms and the chain stretched out flat on the pavement 33, as shown at 34, Fig. 7. If the car is now backed up, as indicated by the arrows 35, the tire will roll onto the chain carrying this clamp around with it, as shown in Figs. 8 and 9, and this clamp will therefore carry the chain around the tire and lay it on the tire with the cross chains over the tread, as indicated in Figs. 8 and 9. After the wheel has made about one revolution, the free ends of the side chains are brought closely together, as indicated in Fig. 9. Then they can be disconnected from the hooks 28, and this device released and removed from the tire by swinging the arm 11 outwardly and then removing the whole device. Then the free ends of the chains can be connected by the usual hooks provided for this purpose.

It will be seen from the above that this provides a simple construction and arrangement which may be readily and quickly applied to the tire by anyone, and then by connecting the side chains to it and laying this chain flat on the pavement to the rear of the tire it can be drawn about and laid in proper position on the tire by merely backing the car for about one revolution of the wheel. The device may be easily and quickly removed and the chain secured in the usual manner.

Having thus set forth the nature of my invention, I claim:

1. A device for applying anti-skid chains including side chains, comprising a substantially U-shaped clamp including spaced curved side arms adapted to embrace the opposite sides of a tire and a connecting bar joining their lower ends and adapted to extend across the tread of the tire, said connecting bar being provided with a longitudinal rib on its under side tapered in cross section to provide an increased grip on the road surface, said rib terminating short of one end of the bar to provide a recess, a hinge connection for one of said arms to the connecting bar at said recess arranged to permit the arm to swing laterally toward and from the tire between closed tire clamping position and open position to release it, a lug on said hinged arm provided with surfaces arranged in different planes at an angle to each other, a heavy flat spring mounted on the connecting bar in said recess and cooperating with said surfaces to retain the hinged arm in the closed and open positions, and means on the side arms for connecting links of the side chains thereto.

2. A device for applying anti-skid chains including side chains, comprising a substantially U-shaped clamp including spaced curved side arms adapted to embrace the opposite sides of a tire and a connecting bar joining their lower ends and adapted to extend across the tread of the tire, a hinged connection for one of said arms to the connecting bar arranged to permit it to swing laterally toward and from the tire between closed tire clamping position and open position to release it, said hinged connection comprising a forked end on one of said members and a lug on the other member pivoted between the sides of the forked end, said lug being provided with adjacent surfaces arranged in different planes at an angle to each other, a heavy spring means mounted on the forked member and including means cooperating with said surfaces to retain the hinged arm in the closed and open positions, and means on the side arms for connecting links of the side chains thereto.

3. A device for applying anti-skid chains including side chains to tires, comprising a substantially U-shaped clamp including spaced curved side arms adapted to embrace the sides of the tire and a connecting cross bar joining their lower ends to lie across the tread, extensions at the free ends of said arms adapted to lie over the outer side portions of the rim on which the tire is mounted, a hinged connection for one of said arms to the connecting bar arranged to permit it to swing laterally toward and from the tire between a holding position on the tire and a released position, said hinged connection comprising a forked end on one of said members and a lug on the other member pivoted between the sides of the forked end, said lug being provided with adjacent surfaces arranged in different planes at an angle to each other, a heavy spring means mounted on the forked member including means cooperating with said surfaces to hold the arm in the holding and released positions, and means on the side arms for connecting links of the side chains thereto.

ISADORE SHAPIRO.

REFERENCES CITED

The following references are of record in the file of this patent:

UNITED STATES PATENTS

| Number | Name | Date |
| --- | --- | --- |
| 1,500,409 | Melton et al. | July 8, 1924 |
| 1,602,317 | Akers | Oct. 5, 1926 |
| 1,921,911 | Darque | Aug. 8, 1933 |
| 2,159,626 | Boycott | May 23, 1939 |
| 2,273,004 | Batty | Feb. 17, 1942 |
| 2,323,917 | Kibler | July 13, 1943 |